United States Patent
Nakahara

(10) Patent No.: US 11,910,473 B2
(45) Date of Patent: Feb. 20, 2024

(54) WIRELESS COMMUNICATION DEVICE, WIRELESS COMMUNICATION SYSTEM, WIRELESS COMMUNICATION METHOD, AND RECORDING MEDIUM

(71) Applicant: CASIO COMPUTER CO., LTD., Tokyo (JP)

(72) Inventor: Shota Nakahara, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 4 days.

(21) Appl. No.: 15/929,278

(22) Filed: Apr. 21, 2020

(65) Prior Publication Data

US 2020/0344588 A1 Oct. 29, 2020

(30) Foreign Application Priority Data

Apr. 23, 2019 (JP) .................................. 2019-081413

(51) Int. Cl.
*H04W 48/14* (2009.01)
*H04W 48/16* (2009.01)
(Continued)

(52) U.S. Cl.
CPC ........... *H04W 8/005* (2013.01); *H04W 48/14* (2013.01); *H04W 48/16* (2013.01); *H04W 76/14* (2018.02); *H04W 84/12* (2013.01)

(58) Field of Classification Search
CPC .. G06F 3/1292; G06F 11/0757; H04W 84/12; H04W 48/14; H04W 8/005;
(Continued)

(56) References Cited

U.S. PATENT DOCUMENTS 8,756,305 B2 6/2014 Hirose
9,268,510 B2 2/2016 Hirose
(Continued)

FOREIGN PATENT DOCUMENTS

JP 2004328273 A 11/2004
JP 2015023538 A 2/2015
(Continued)

OTHER PUBLICATIONS

Japanese Office Action (and English language translation thereof) dated Aug. 3, 2021 issued in counterpart Japanese Application No. 2019-081413.
(Continued)

*Primary Examiner* — Khaled M Kassim
*Assistant Examiner* — Jason A Harley
(74) *Attorney, Agent, or Firm* — Holtz, Holtz & Volek PC

(57) ABSTRACT

A wireless communication device includes a processor and a memory configured to store a program for establishing a wireless connection with a terminal device. The processor establishes, in accordance with the program stored in the memory, the wireless connection with the terminal device upon request for the wireless connection from one of the wireless communication device and the terminal device. Upon establishment of the wireless connection with the terminal device, the processor queries the terminal device with which the wireless connection is established to check a state of an application program for causing the wireless communication device to execute a specific function. The processor maintains or cuts off the wireless connection with the terminal device based on a state of a response of the terminal device with respect to the query.

15 Claims, 11 Drawing Sheets

(51) Int. Cl.
*H04W 84/12* (2009.01)
*H04W 4/00* (2018.01)
*H04W 88/02* (2009.01)
*H04W 12/08* (2021.01)
*H04B 1/38* (2015.01)
*H04L 9/00* (2022.01)
*H04W 8/00* (2009.01)
*H04W 76/14* (2018.01)

(58) Field of Classification Search
CPC . H04W 52/0258; H04W 48/12; H04W 76/14; H04W 76/30; H04W 76/10; H04L 67/142; H04L 67/143; H04L 67/2819; H04L 69/40
USPC .................. 455/67.11; 370/252; 379/100.06
See application file for complete search history.

(56) References Cited

U.S. PATENT DOCUMENTS

| | | | |
|---|---|---|---|
| 9,986,591 B2 | 5/2018 | Yada | |
| 10,264,148 B2 | 4/2019 | Tsuchiya | |
| 10,568,151 B2 | 2/2020 | Tsurumi | |
| 11,026,088 B2 | 6/2021 | Masuoka et al. | |
| 2006/0200563 A1 | 9/2006 | Hirose | |
| 2008/0240438 A1* | 10/2008 | Huang | H04W 12/04 380/270 |
| 2009/0320106 A1* | 12/2009 | Jones | G06Q 20/206 726/5 |
| 2011/0210618 A1* | 9/2011 | Takasu | H04W 76/14 307/104 |
| 2012/0201360 A1* | 8/2012 | Bugenhagen | H04L 1/0022 379/32.01 |
| 2013/0132576 A1* | 5/2013 | Haba | H04L 41/0809 709/225 |
| 2013/0201525 A1* | 8/2013 | Niwa | G06F 3/1292 358/1.15 |
| 2014/0098250 A1 | 4/2014 | Hirose | |
| 2016/0105888 A1* | 4/2016 | Seok | H04W 72/0446 370/329 |
| 2016/0127928 A1* | 5/2016 | McClure | G06F 11/0784 455/425 |
| 2016/0286543 A1* | 9/2016 | Putterman | H04W 8/005 |
| 2016/0344599 A1* | 11/2016 | Porter | H04L 41/5032 |
| 2017/0130945 A1* | 5/2017 | Kitano | H04B 1/38 |
| 2017/0279988 A1 | 9/2017 | Tsuchiya | |
| 2018/0121321 A1* | 5/2018 | Standley | G06F 9/4411 |
| 2018/0220475 A1 | 8/2018 | Tsurumi | |
| 2018/0317071 A1* | 11/2018 | Rabii | H04W 12/08 |
| 2018/0357069 A1* | 12/2018 | Fujisaki | G06F 8/61 |
| 2019/0191043 A1 | 6/2019 | Tsuchiya | |
| 2019/0370201 A1* | 12/2019 | Okamoto | G06F 21/34 |

FOREIGN PATENT DOCUMENTS

| | | |
|---|---|---|
| JP | 2015146561 A | 8/2015 |
| JP | 2015197819 A | 11/2015 |
| JP | 2017175295 A | 9/2017 |
| JP | 2018037966 A | 3/2018 |
| JP | 2018122540 A | 8/2018 |
| WO | 2016031062 A1 | 3/2016 |

OTHER PUBLICATIONS

Japanese Office Action dated Mar. 28, 2023 (and English translation thereof) issued in counterpart Japanese Application No. 2022-083577.

* cited by examiner

FIG. 9

| NO. | MAC ADDRESS | CONNECTION PROHIBITION START TIME (DATE, TIME) | CONNECTION PROHIBITION PERIOD (SECONDS) |
|---|---|---|---|
| 1 | CA:CA:CA:CA:CA:CA | 2018/3/25 16:31:29 | 10 |
| 2 | DA:DA:DA:DA:DA:DA | 2018/3/22 10:57:50 | 10 |
| 3 | BA:BA:BA:BA:BA:BA | 2018/3/26 21:33:18 | 10 |

WIRELESS COMMUNICATION DEVICE, WIRELESS COMMUNICATION SYSTEM, WIRELESS COMMUNICATION METHOD, AND RECORDING MEDIUM

CROSS-REFERENCE TO RELATED APPLICATION

This application claims the benefit of Japanese Patent Application No. 2019-081413, filed on Apr. 23, 2019, the entire disclosure of which is incorporated by reference herein.

FIELD

The present disclosure relates to a wireless communication device, a wireless communication system, a wireless communication method, and a recording medium.

BACKGROUND

Wireless communication devices exist such as printers that are equipped with a wireless communication function for performing exchange of data with a terminal device such as a smart phone by wireless communication.

Although the wireless communication device performs exchange of data with the terminal device after establishing a connection with the terminal device, the number of terminal devices capable of connecting at one time with the wireless communication device is limited. However, the terminal device may have a function for, once connected, connecting automatically with the wireless communication device. When multiple terminal devices connected to the wireless communication device are present in the vicinity of the wireless communication device, terminal devices for connection may not be in accordance with intent of the user may automatically connect with the wireless communication device, and a terminal device for which connection with the wireless communication device is desired may be unable to connect with the wireless communication device.

Unexamined Japanese Patent Application Kokai Publication No. 2017-175295 discloses a method for prevention, by use of a connection rejection list, of automatic connection to a printer by a terminal device for which connection is not in accordance with intent of the user. Upon occurrence of a new connection request when a connection unit count is at an upper limit, the user selects a terminal device for disconnection, and the selected terminal device is disconnected and recorded in the connection rejection list. The terminal recorded in the connection rejection list has connection requests refused, and reconnection to the printer disabled until the terminal is removed from the connection rejection list.

SUMMARY

According to one aspect of the present disclosure, a wireless communication device including a processor and a memory configured to store a program for establishing a wireless connection with a terminal device is provided. The processor is configured to establish, in accordance with the program stored in the memory, the wireless connection with the terminal device upon request for the wireless connection from one of the wireless communication device and the terminal device. The processor is further configured to query, upon establishment of the wireless connection with the terminal device, the terminal device with which the wireless connection is established to check a state of an application program for causing the wireless communication device to execute a specific function. The processor is further configured to maintain or cut off the wireless connection with the terminal device based on a state of a response of the terminal device with respect to the query.

According to another aspect of the present disclosure, a wireless communication system including a wireless communication device and a terminal device configured to wirelessly communicate with each other is provided. The wireless communication device includes a first processor and a memory configured to store a program for establishing a wireless connection with the terminal device. The terminal device includes a second processor. The first processor of the wireless communication device is configured to establish, in accordance with the program stored in the memory, the wireless connection with the terminal device upon request for the wireless connection from one of the wireless communication device and the terminal device. The first processor of the wireless communication device is further configured to query, upon establishment of the wireless connection with the terminal device, the terminal device with which the wireless connection is established to check a state of an application program for causing the wireless communication device to execute a specific function. The first processor of the wireless communication device is further configured to maintain or cut off the wireless connection with the terminal device based on a state of a response of the terminal device with respect to the query. The second processor of the terminal device is configured to respond to the query from the wireless communication device.

According to still another aspect of the present disclosure, a wireless communication method executed by a wireless communication device for communication with a terminal device is provided. The wireless communication method includes establishing a wireless connection with the terminal device upon request for the wireless connection from one of the wireless communication device and the terminal device, querying, upon establishment of the wireless connection with the terminal device, the terminal device with which the wireless connection is established to check a state of an application program for causing the wireless communication device to execute a specific function, and maintaining or cutting off the wireless connection with the terminal device based on a state of a response of the terminal device with respect to the querying.

According to still yet another aspect of the present disclosure, a non-transitory computer-readable recording medium for recording a program for causing a computer included in a wireless communication device to execute processing is provided. The processing includes establishing a wireless connection with the terminal device upon request for the wireless connection from one of the wireless communication device and the terminal device. The processing further includes querying, upon establishment of the wireless connection with the terminal device, the terminal device with which the wireless connection is established to check a state of an application program for causing the wireless communication device to execute a specific function. The processing further includes maintaining or cutting off the wireless connection with the terminal device based on a state of a response of the terminal device with respect to the querying.

BRIEF DESCRIPTION OF THE DRAWINGS

A more complete understanding of this application can be obtained when the following detailed description is considered in conjunction with the following drawings, in which:

FIG. 9 illustrates a connection-prohibited terminal list according to the embodiment of the present disclosure;

DETAILED DESCRIPTION

Embodiment 1

A wireless communication device according to an embodiment of the present disclosure is described below with reference to drawings.

Figure 1:
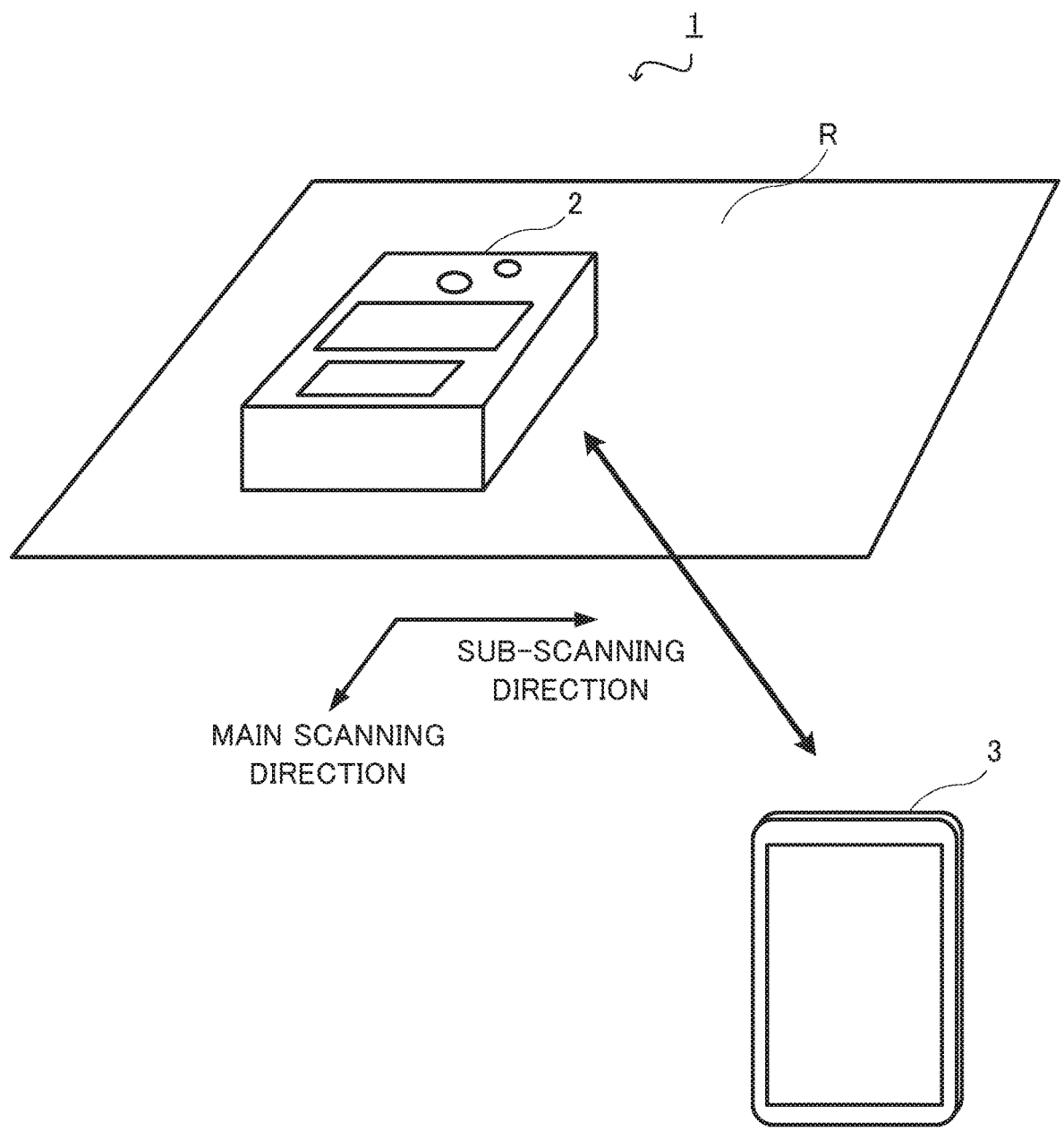
FIG. 1 illustrates configuration of a wireless communication system according to an embodiment of the present disclosure.

In a wireless communication system 1 according to the present embodiment, as illustrated in FIG. 1, a terminal device 3 and a coating device 2 that is a wireless communication device are wirelessly connected to each other.

The coating device 2 that is the wireless communication device is a coating device provided with a wireless communication module for performing wireless communication such as wireless local area network (LAN), Bluetooth (registered trademark), or the like.

The coating device 2 is a device that can apply a coating target image such as characters, symbols, graphics, signs, symbols, or the like onto a coating medium R by application of ink in accordance with movement of the coating device 2 on the coating medium R.

Examples of the coating medium R include printing paper, labels, corrugated cardboard, or the like. Alternatively, the coating medium R is not limited to objects formed from the substance paper, and may include plastics, metals, woods, or the like, and elastic substances that deform upon application of pressure to the surface, such as skin such as that of humans and/or animals, rubber objects such as tires and tubing, and fibrous objects such as fabrics and hides. Any type of substance may be uses as long as ink can be applied thereto.

Moreover, the coating device 2 may be a device that applies a desired color to a coating surface. For example, by application to the coating medium R of ink on top of dirt, stains, or the like, the dirt, stains, or the like may be hidden by coverage using ink of the desired color.

The coating device 2 is termed a handheld printer, a direct printer, a handy printer, or the like, is sized so as to be easily grasped by a hand of a user, and forms the image on the coating medium R by the user scanning the coating device 2 in a sub-scanning direction to apply the ink.

The terminal device 3, for example, may be configured as a smartphone or tablet personal computer (PC) equipped with a display.

The terminal device 3 is equipped with a wireless communication module for performing wireless communication by wireless LAN, Bluetooth (registered trademark), or the like, and can perform wireless communication by connection with the coating device 2 that is the wireless communication device.

In the terminal device 3, a dedicated coating application program is installed for causing the coating device 2 to execute coating. By wireless transmission to the coating device 2 of image data desired for coating via this dedicated application, the transmitted image data is used by the coating device 2 for coating. This application program is distributed from a vendor via the Internet, or alternatively, is distributed via compact disc read only memory (CD-ROM), digital versatile disc read only memory (DVD-ROM), or the like, and the user obtains the application program by such means. Alternatively, the application program is installed beforehand on the terminal device 3.

The coating device 2 and the terminal device 3 in this manner are configured so as to be capable of communication with each other via a wireless circuit. Forms of connection of wireless communication by wireless LAN can be broadly classified into two modes, according to whether or not an access point is used. In one mode, the access point is a wireless device for interconnection between the wireless terminals, and this mode corresponds to the infrastructure mode of the Wi-Fi standard, for example. In another mode, the terminals communicate directly with each other without communication via the access point, and such a mode corresponds to the ad-hoc mode of the Wi-Fi standard for connection between terminals by the peer-to-peer (P2P) method, for example. Moreover, a Wi-Fi Direct (WFD) method exists, as a method for improving the ad-hoc mode, that performs direct communication between terminals by using a software access point to impart to a terminal the functions of an access point. Although the form of connection of wireless communication in the present embodiment operates the coating device 2 as the access point or station of the infrastructure mode, this form can also include a method of direct communication between terminals such as WFD, Bluetooth (registered trademark), or the like.

Figure 2A:
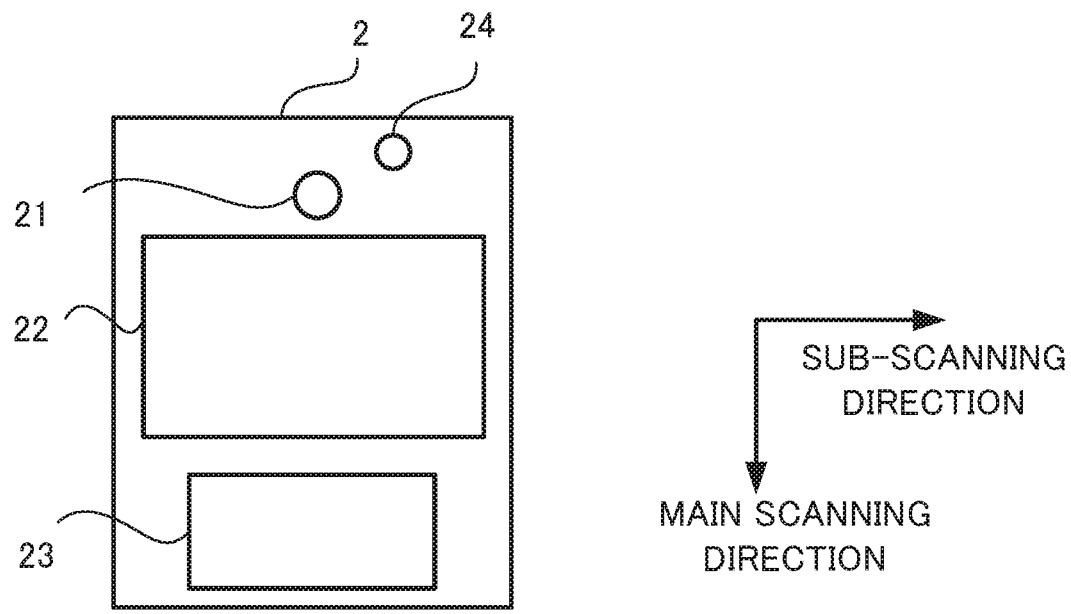
FIG. 2A illustrates external appearance of an upper surface of a coating device according to the embodiment of the present disclosure.

As illustrated in FIG. 2A, a coating-start switch 21, a display device 22, operation keys 23, and a light emitting diode (LED) 24 are arranged on the upper surface of the coating device 2.

The coating-start switch 21 is operated by the user for issuing a command for the start of coating. The display device 22 displays information such as wireless connection-related information, an image of a coating target, format settings, various types of guidance, or the like. The operation keys 23 are operated by the user and include keys for setting the wireless connection and the coating format. The LED 24 emits light to provide notification to the user that a coating-start position is reached, that coating is completed, or the like.

Figure 2B:
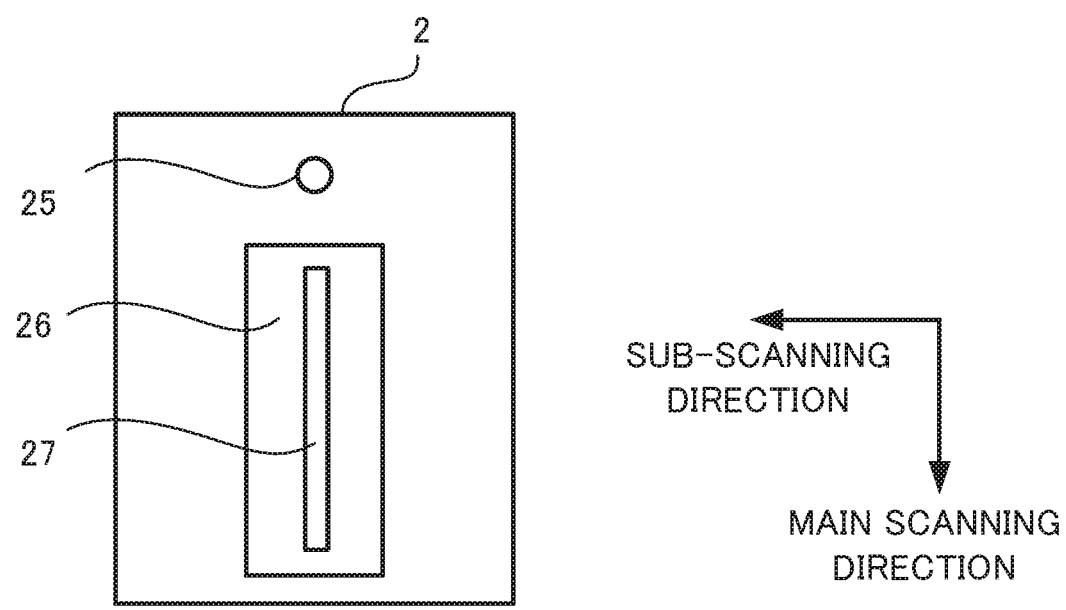
FIG. 2B illustrates external appearance of a lower surface of the coating device according to the embodiment of the present disclosure.

As illustrated in FIG. 2B, an ink head 26 and an optical sensor 25 for detection of the position of the coating device 2 are arranged on a lower surface of the coating device 2.

The optical sensor 25 is disposed in the vicinity of the ink head 26. The optical sensor 25 is configured similarly to that of an optical mouse and detects movement amounts in a main scanning direction and the sub-scanning direction.

The ink head 26 is an inkjet type head and is equipped with multiple ink nozzles 27 arranged in alignment in the main scanning direction. The ink head 26 selectively discharges ink from the ink nozzles 27 to form the image on the coating medium R.

Figure 3:
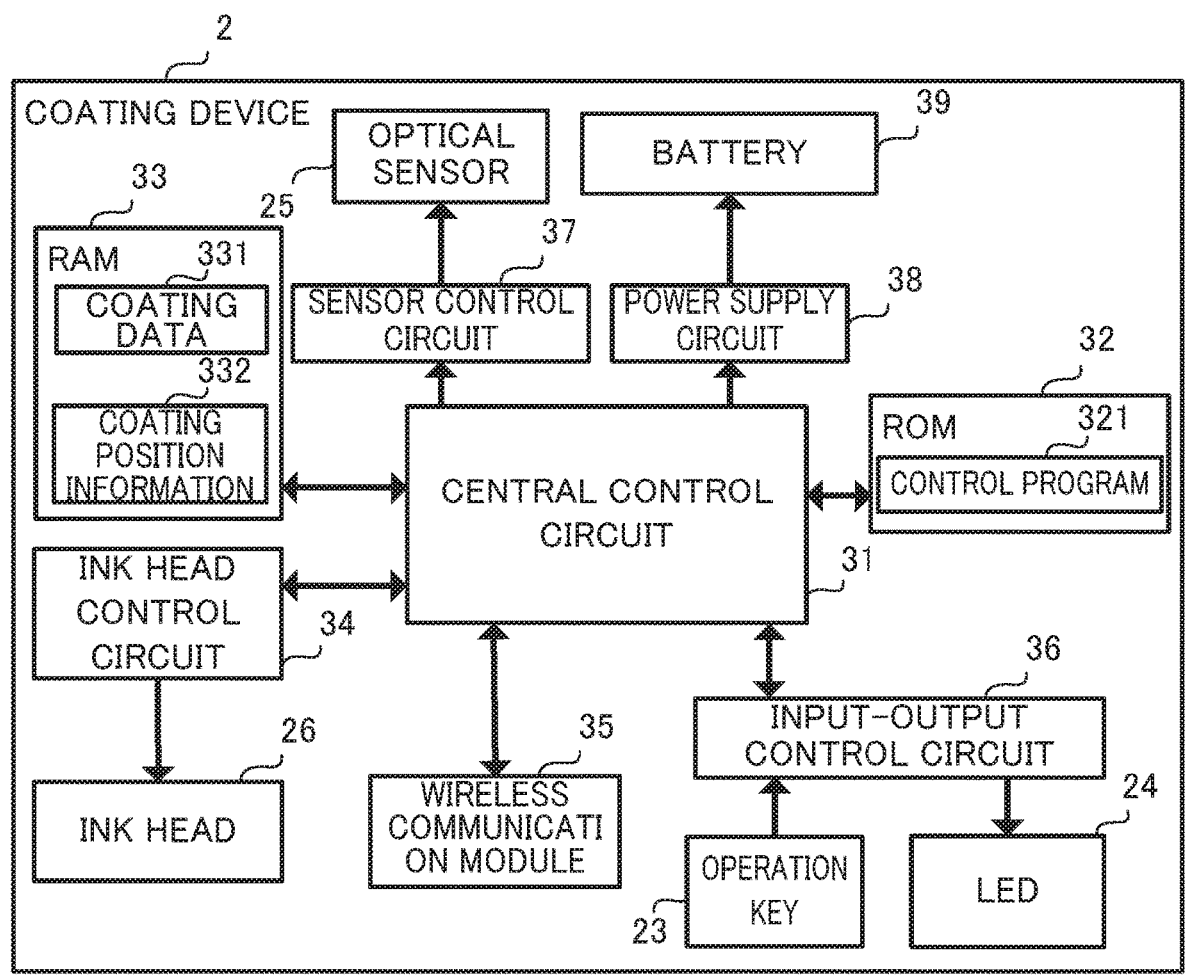
FIG. 3 is a hardware configuration drawing of the coating device according to the embodiment of the present disclosure.

As illustrated in FIG. 3, the coating device 2 is equipped with hardware components including a central control circuit 31 for overall device control, a read only memory (ROM) 32 that is a non-volatile memory circuit, a random access memory (RAM) 33 that is a volatile memory circuit, an ink head control circuit 34 for control of the ink head 26, a wireless communication module 35 for performing wireless communication with an external apparatus, an input-output control circuit 36 for control of input by the operation keys 23 and output to the LED 24, a sensor control circuit 37 for control of the optical sensor 25, a power supply circuit 38, and a battery 39.

The central control circuit 31 is equipped with a processor, is connected to various circuits via a bus, and performs overall device control by performing various types of functions by executing a control program stored in the ROM 32.

The ROM 32 stores various types of fixed data and a control program 321 for the central control circuit 31 to achieve various types of functions. The RAM 33 functions as a working region of the central control circuit 31. The central control circuit 31 reads out various types of data temporarily stored in the RAM 33, such as coating data 331, coating position information 332, or the like to execute various types of processing. The coating data 331 is image data, indicating the image that is to be applied, that is transmitted from the wirelessly-connected terminal device 3, received via the wireless communication module 35, and stored in the RAM 33 via the central control circuit 31. The coating position information 332 is information indicating the position of the ink head 26 on the coating medium R, is determined by the sensor control circuit 37 based on a movement distance detected by the optical sensor 25, and is stored in the RAM 33 via the central control circuit 31.

The wireless communication module 35 is equipped with an interface for performing communication with the terminal device 3 via a wireless local area network (LAN), Bluetooth (registered trademark), or the like, and performs wireless communication with the terminal device 3 via a non-illustrated antenna. The user transmits to the coating device 2 data such as the coating data from the terminal device 3 via the wireless communication module 35.

The input-output control circuit 36 converts signals input from the operation keys 23 to data, transmits the converted data to the central control circuit 31, and controls lighting of the LED 24 on the basis of a control signal from the central control circuit 31. The LED 24 emits light to provide to the user notification such as that the coating start position is reached, the coating is completed, or the like.

The sensor control circuit 37 controls the aforementioned optical sensor 25 and detects the scanning amount, that is, the movement distance, of the coating device 2 in the main scanning direction and the sub-scanning direction.

The ink head control circuit 34 controls operation of the ink head 26 and performs coating based on freely-selected coating data. The ink head control circuit 34 controls the discharge of ink from the ink head 26 during coating. The ink head control circuit 34 receives the coating data and the coating signal output by the central control circuit 31, and controls the energized dots of the ink head 26 via a driver integrated circuit (IC) arranged within the ink head control circuit 34. Due to such operation, the ink head control circuit 34 causes the discharge of the ink from the ink head 26 and causes the execution of coating.

The power supply circuit 38 is equipped with components such as a power supply IC and supplies electrical power to various circuits from a battery 39 as may be required. The power supply circuit 38 also charges the battery 39.

Figure 4:
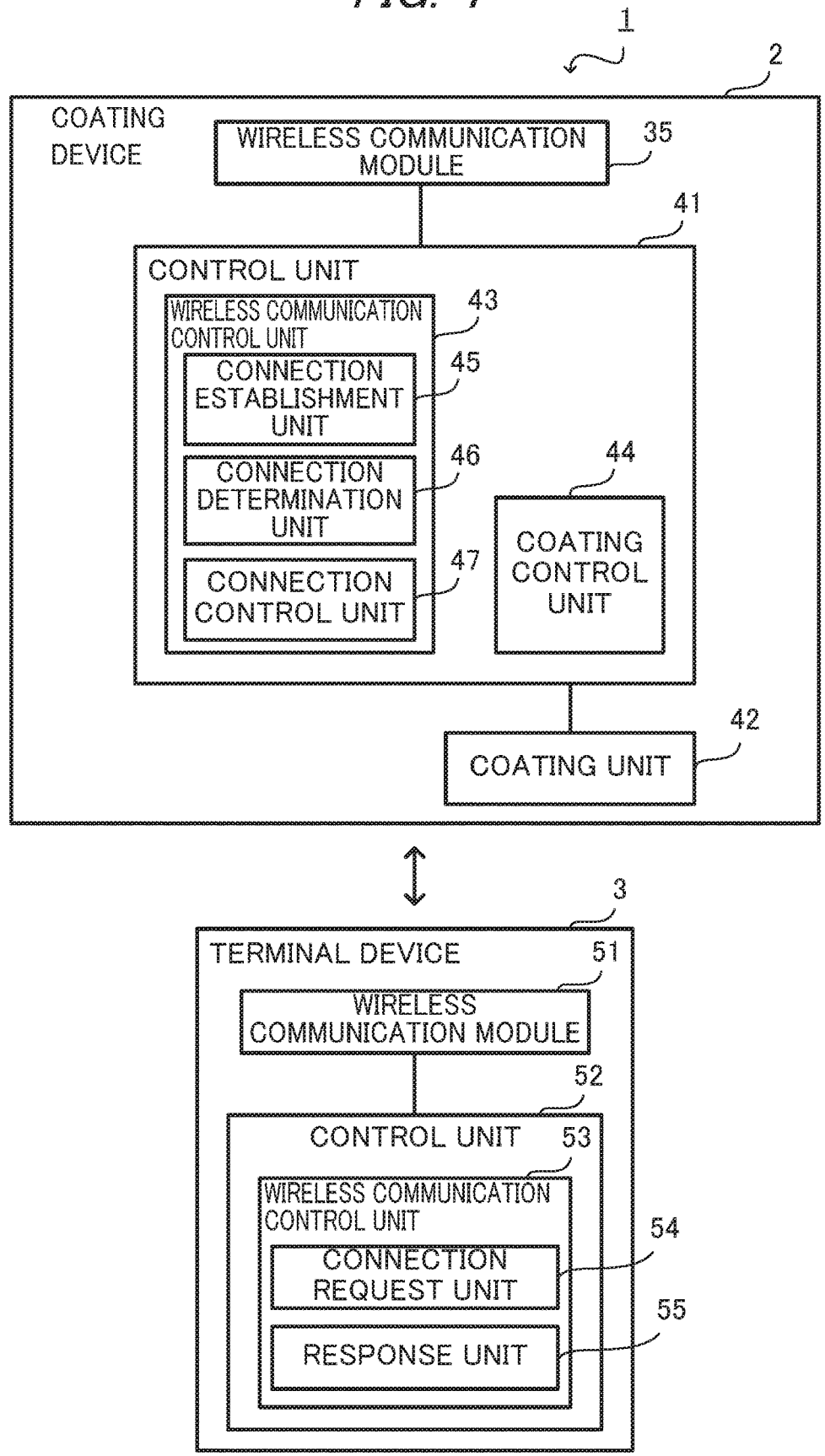
FIG. 4 is a functional configuration drawing of the coating device and a terminal device according to the embodiment of the present disclosure.

FIG. 4 illustrates functional configuration of the coating device 2 and the terminal device 3 included in the wireless communication system 1.

The coating device 2 that is the wireless communication device is equipped with a coating unit 42 and a control unit 41 that is connected to the wireless communication module 35.

The control unit 41 includes the central control circuit 31, the ROM 32, and the RAM 33 of FIG. 3, and performs overall device control. The control unit 41 is equipped with a wireless communication control unit 43 and a coating control unit 44.

The wireless communication control unit 43 controls the wireless communication module 35 to perform wireless communication with the terminal device 3. The wireless communication control unit 43 controls connection to, and disconnection from, the terminal device 3 on the basis of setting information such as a Wi-Fi connection ID, password, or the like stored in the ROM 32 and the RAM 33.

The coating control unit 44 forms the image on the coating medium R by controlling the coating unit 42, that includes the ink head 26 and the ink head control circuit 34, in accordance with the coating data sent from the terminal device 3.

By execution of a control program stored in the ROM 32, the wireless communication control unit 43 serves as a connection establishment unit 45, a connection determination unit 46, and a connection control unit 47 as illustrated in FIG. 4.

The connection establishment unit 45 controls the wireless communication module 35 and establishes the wireless connection with respect to the wireless connection request from the terminal device 3. The wireless communication control unit 43 receives the coating data from the terminal device 3 on the established communication circuit.

The connection determination unit 46 sends a query signal to the terminal device 3 for which wireless connection is established, and on the basis of the response of the terminal device 3 to the query, makes a determination as to whether the wireless connection established with the terminal device 3 is in accordance with intent of the user, that is, whether the connection is to be made. The connection determination unit 46 serves as a connection determination means of the present disclosure. Moreover, in the case in which the determination is made that the established wireless connection is not a connection in accordance with intent of the user, that is, is a connection that is not to be made, a media access control (MAC) address, a connection prohibition start time, and a connection prohibition period of the terminal device 3 are written by the connection determination unit 46 to a below-described connection-prohibited terminal list.

In accordance with the determination of the connection determination unit 46 on the basis of the response from the terminal device 3, the connection control unit 47 cuts off or maintains the wireless connection with the terminal device 3.

The terminal device 3 is equipped with a control unit 52 for overall device control and a wireless communication module 51 that is a wireless LAN interface. The control unit 52 includes a non-illustrated central processing unit (CPU), a ROM, and a RAM.

The control unit 52 is equipped with a wireless communication control unit 53. The wireless communication control unit 53 controls the wireless communication module 51 for wireless communication with the coating device 2.

The wireless communication module 51 transmits, from a non-illustrated antenna, a wireless signal to the coating device 2 that is the wireless communication device, and receives a wireless signal from the coating device 2.

The wireless communication control unit 53 is equipped with a connection request unit 54 for requesting wireless connection with the coating device 2, and a response unit 55 for responding to the query from the coating device 2.

The connection request unit 54 requests of the coating device 2 wireless connection in accordance with setting information, for example, such as an ID, password, or the like for Wi-Fi connection stored in the ROM or the RAM.

In response to the query from the coating device 2 for determining whether the wireless connection is in accordance with intent of the user, the response unit 55, based on the dedicate coating application program stored in the ROM or the RAM for causing the coating device 2 to function by performing the coating function, outputs a response signal in the case in which a connection is in accordance with intent of the user.

Figure 5:
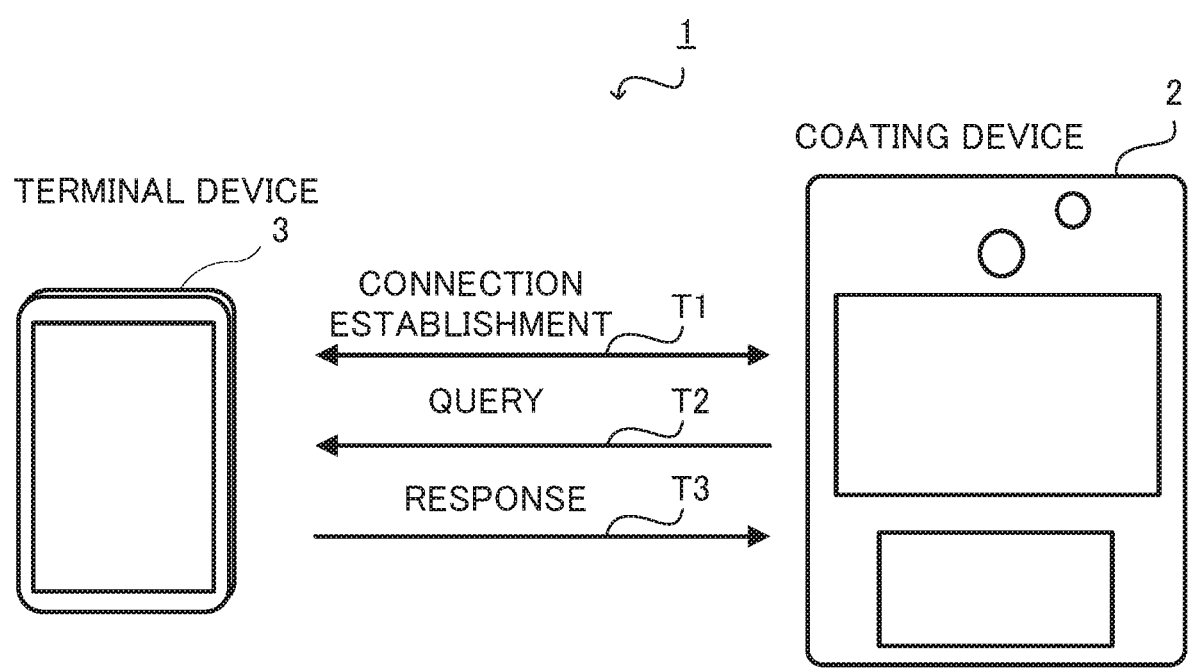
FIG. 5 is a drawing for schematic description of connection processing according to the embodiment of the present disclosure.

FIG. 5 illustrates schematically information exchange between the terminal device 3 and the coating device 2 concerning connection processing in this wireless communication system 1.

The terminal device 3 makes a connection request with respect to the coating device 2, and performs connection establishment processing for establishing the wireless connection between the terminal device 3 and the coating device 2 (T1). The coating device 2 makes a query, with respect to the terminal device 3 for which connection establishment processing was performed, as to whether the connection is in accordance with intent of the user (T2). The terminal device 3 performs response processing with respect to the query from the coating device 2 (T3). The coating device 2 determines, based on the response from the terminal device 3, whether the connection is in accordance with intent of the user, and performs connection control by maintaining or cutting off the connection with the terminal device 3.

Figure 6:
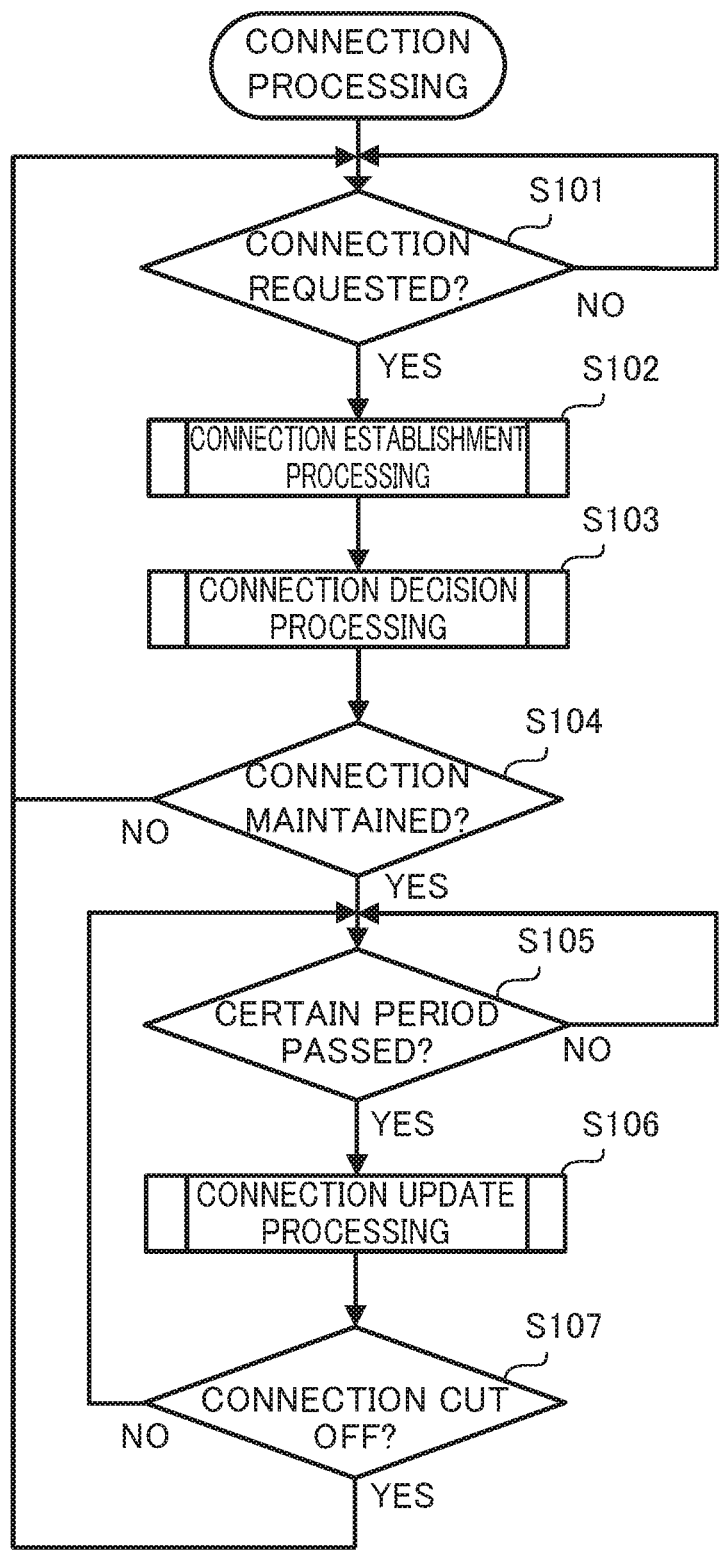
FIG. 6 is a flowchart illustrating the connection processing according to the embodiment of the present disclosure.

Connection processing is described hereinafter in detail. FIG. 6 illustrates connection processing, occurring at the coating device 2, for connection with the terminal device 3.

Prior to performing wireless connection with the coating device 2 that is the communication partner, the terminal device 3 that is the external device transmits a search signal to search for the coating device 2. Upon receiving the search signal, the coating device 2 transmits the response signal to the terminal device 3. By receiving the response signal from the coating device 2, the terminal device 3 detects the coating device 2 that is the communication partner. Upon detection of the coating device 2, the terminal device 3 transmits a connection request signal in order to establish the wireless connection with the coating device 2. The coating device 2 determines whether the connection request signal requesting the wireless connection is received from the external device (step S101). Upon reception of the connection request signal from the terminal device 3 that is the external device (YES in step S101), the coating device 2 executes connection establishment processing with respect to the terminal device 3 and establishes the wireless connection to the terminal device 3 (step S102). Upon establishment of the wireless connection, the coating device 2 executes connection determination processing with respect to the terminal device 3 (step S103). However, if the coating device 2 does not receive the connection request signal from the terminal device 3 (NO in step S101), the coating device 2 performs standby by repeating the processing of step S101 up until signal reception.

Figure 7:
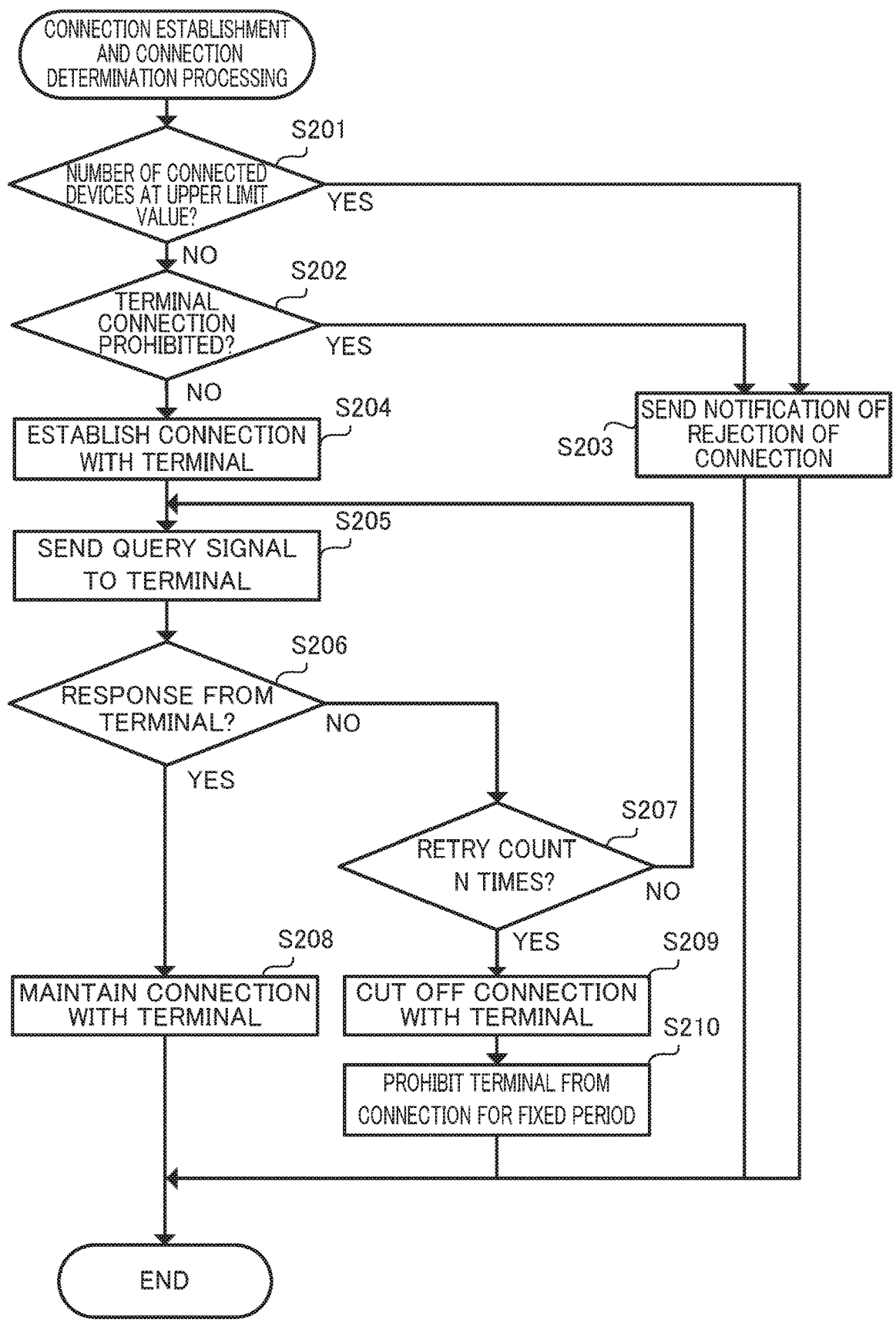
FIG. 7 is a flowchart illustrating connection establishment and connection determination processing according to the embodiment of the present disclosure.

Connection Establishment Processing FIG. 7 illustrates connection establishment and connection determination processing occurring at the coating device 2. Steps S201 to S204 of FIG. 7 correspond to connection establishment processing, and step S205 and beyond correspond to connection determination processing.

Upon receiving the connection request signal, the coating device 2 determines whether the number of devices presently wirelessly connected to the coating device 2 is greater than or equal to an upper limit value (step S201). The number of devices capable of being simultaneously connected is limited in a wireless LAN. Although multiple units can be connected in the case of the WFD connection, the number of connectable units is one in the case of a device compatible with WFD connection in general use.

If the connection unit count is the upper limit value (YES in step S201), notification of rejection of the wireless connection request from the terminal device 3 is sent to the terminal device 3 (step S203). That is to say, if the coating device 2 is connected to any device, connection is refused with respect to the connection request from the new terminal device 3. By refusal of the connection with the terminal device 3, connection is maintained with the presently connected device for which connection with the coating device 2 is required.

If the connection unit count does not reach the upper limit value (NO in step S201), the below-described connection-prohibited terminal list is referenced to make a determination as to whether the new terminal device 3 is a terminal device for which connection is prohibited (step S202). Information on the terminal devices for which connection is prohibited is managed by using the connection-prohibited terminal list.

When the terminal device 3 corresponds to a terminal device listed in the connection-prohibited terminal list (YES in step S202), the coating device 2 transmits to the terminal device 3 a notification of refusal of the wireless connection request from the terminal device 3 (step S203), and then ends processing. The terminal device 3 having the refused connection request does not wirelessly connect to the coating device 2.

When the terminal device 3 does not correspond to a terminal device listed in the connection-prohibited terminal list (NO in step S202), the coating device 2 establishes the connection with the terminal device 3 by transmitting an acknowledgement of connection to the terminal device 3 with respect to the connection request from the terminal device 3 (step S204).

Connection Determination Processing

Upon establishment of the connection with the terminal device 3, connection determination processing with respect to this new connection is executed as step S205 and beyond. The coating device 2 transmits a query signal to the terminal device 3 (step S205). This signal is a query signal for determining whether the new connection is an unnecessary connection, which is a connection not in accordance with intent of the user. Whether the connection is in accordance with intent of the user is determined by whether a dedicated coating application installed on the terminal device 3 is running.

For example, in the case of the wireless LAN, data such as use datagram protocol (UDP) packet data, as a query signal, is transmitted to a specified destination port allocated to the dedicated coating application. The data of the query signal is encoded, and content cannot be read except by the dedicated application. The data of the query signal is data requesting a response indicating that, upon reception of such data, the dedicated application is running.

The coating device 2 checks whether there is a response from the terminal device 3 with respect to the query transmitted to the terminal device 3 (step S206).

Response Processing

Figure 8:
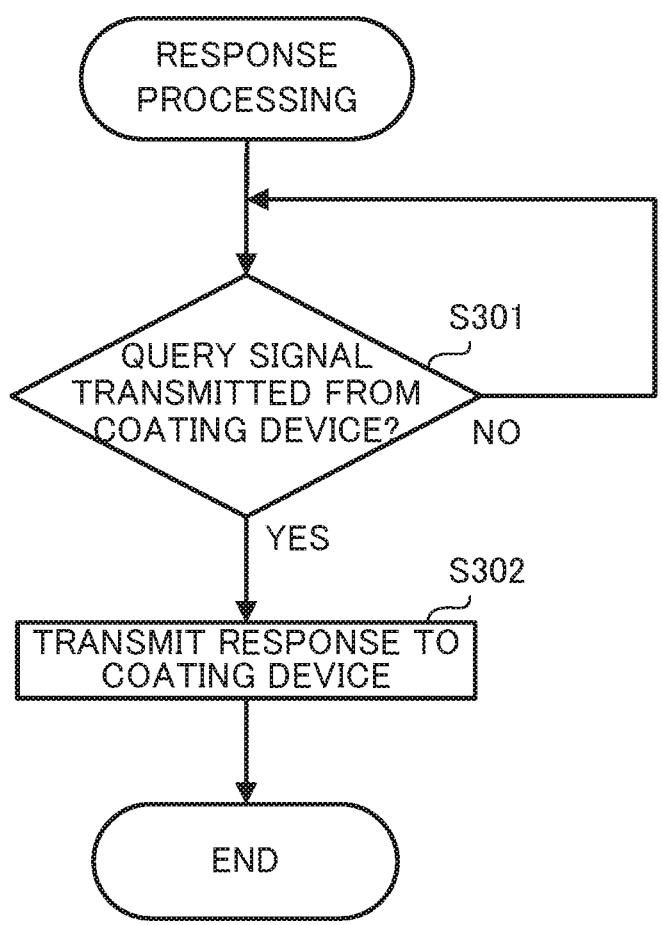
FIG. 8 is a flowchart illustrating response processing according to the embodiment of the present disclosure.

FIG. 8 illustrates response processing of the terminal device 3. Such processing is performed by a dedicated application within the terminal device 3. The dedicated application determines whether the query signal is transmitted from the coating device 2 (step S301). The dedicated application deciphers the data transmitted to the port of the dedicated application from the coating device 2 and determines whether the deciphered data is a query.

When the dedicated application determines that the query signal from the coating device 2 is previously transmitted (YES in step S301), the dedicated application transmits a response to the coating device 2 (step S302). For example, in the case of the wireless LAN, data such as transmission control protocol (TCP) packet data to the specified destination port is used as the response.

When there is no query from the coating device 2 (NO in step S301), the dedicated application repeats the processing of step S301 until there is a query.

When the dedicated application is not running on the terminal device 3, this response processing is not executed, and the response to the coating device 2 is not transmitted. Similar response processing is to be executed even in the below-described connection update processing, and thus processing is configured such that the terminal device 3 always returns a response to the coating device 2 in the state in which the dedicated application is running.

With reference again to FIG. 7, if there is a response from the terminal device 3 with respect to the query (YES in step S206), the determination is made that the established wireless connection is in accordance with intent of the user, and processing ends with the wireless connection with the terminal device 3 being maintained as is (step S208).

The response from the terminal device 3 with respect to the query indicates that the dedicated application is installed on the terminal device 3 and further that the dedicated application is running.

The non-existence of the response from the terminal device 3 with respect to this query indicates that the dedicated application is not installed on the terminal device 3. Alternatively, a state is indicated in which, although the dedicated application is installed on the terminal device 3, the dedicating application is not running.

In the state in which the dedicated application is not installed, the terminal device 3 is unable to cause execution of coating by the coating device 2. In this case, connection of the terminal device 3 to the coating device 2 is not considered to be in accordance with intent of the user, and the connection of the terminal 3 with the coating device 2 is considered to have been made automatically. Thus, a determination is made that the connection between the terminal device 3 and the coating device 2 is an unnecessary connection that is not in accordance with intent of the user. Moreover, in the state in which the dedicated application is not running, the terminal device 3 is unable to allow the coating device 2 to execute coating. Initiation of the application is necessary as a prerequisite for the terminal device 3 to cause execution of the dedicated application to perform coating. Therefore, in the case of the state in which the dedicated application is not running, a determination is made that the connection between the terminal device 3 and the coating device 2 is an unnecessary connection that is not in accordance with intent of the user.

If there is no response from the terminal device 3 with respect to the query (NO in step S206), a check is performed as to whether a retry count of queries sent to the terminal device 3 reaches a prescribed count N (where N is an integer greater than or equal to 1) (step S207).

If the retry count of queries does not reach N times (NO in step S207), the retry count of queries is incremented by 1, processing returns to step S205, and the query signal is transmitted again. Then the check is performed again as to check whether the response from the terminal device 3 with respect to the query is received (step S206). When there is no response from the terminal device 3 (NO in step S206), the check is performed as to whether the retry count of N time is reached (step S207), and when the retry count of N times is not reached (NO in step S207), the retry count is further incremented by 1. Thereafter, until the retry count reaches N times, the processing of step S205 through step S207 is repeated until there is a response from the terminal device 3.

In the case in which the retry count previously reaches N times without a response from the terminal device 3 (YES in step S207), a determination is made that the established wireless connection is not in accordance with intent of the user, and the coating device 2 cuts off the connection with the terminal device 3 (step S209). Further, a determination may made as to whether there is a response from the terminal device 3 within a prescribed period after transmission of the query signal, the connection with the terminal device 3 may be cut off if there is no response within the prescribed period, and the connection may be continued if there is a response. Erroneous cutoff is prevented by carefully performing the detection of the response. The determination is made carefully because, when the connection is cut off due to an immediate determination that the connection is unnecessary based on non-detection of the response even though the connection is essentially required, the transmission of the coating data that is to be performed during the period of the cutoff can be interrupted while in progress. Upon cutoff of the connection, the terminal device 3 having the cut off connection is prohibited for a fixed period from reconnecting with the coating device 2 (step S210), and the processing ends. Prohibiting of the reconnection for the fixed period is achieved by recording information of the terminal device having the cut off connection in the connection-prohibited terminal list.

Connection-Prohibited Terminal List

An example of configuration of the connection-prohibited terminal list is illustrated in FIG. 9. The connection-prohibited terminal list is a list of the terminal devices 3 for which connection with the coating device 2 is prohibited, and the coating device 2 uses the connection-prohibited terminal list to perform identification and management of the terminal devices 3 for which connection is prohibited. This connection-prohibited terminal list is stored as data in locations such as the RAM 33 and ROM 32 of the coating device 2.

In the example of FIG. 9, the MAC address is used as the ID for identification of the terminal device 3. The identification ID is not limited to the MAC address, but rather may be any identifying information unique to the terminal device 3. The connection prohibition period and the connection prohibition start time at which the connection became prohibited for the terminal device 3 are held in the connection-prohibited terminal list, and by use of such information, the determination is made for each terminal device as to whether connection is prohibited.

The recording in the connection-prohibited terminal list, in the aforementioned manner, is performed, when the coating device 2 is connected to the terminal device 3, in the case in which there is no response with respect to the check, performed by the coating device 2, of the wireless connection executed for the specified number of times.

Moreover, in below-described connection update processing, as long as the terminal device 3 is connected to the coating device 2, connection determination processing is performed periodically, and during such processing, the terminal device 3 from which there is no response is recorded in the connection-prohibited terminal list.

Recording in the connection-prohibited terminal list is performed by recording the MAC address for identification of the terminal device, the connection prohibition time for prohibition of reconnection, and the period of prohibition of the connection. The time at which the recording to the connection-prohibited terminal list is performed is recorded as the connection prohibition start time. Moreover, the connection prohibition period is recorded as a specified period. The terminal device 3 recorded in the connection-prohibited terminal list is prohibited from reconnection to the coating device 2 during the connection prohibition period since the connection prohibition start time. In the example of FIG. 9, the connection prohibition period is set to 10 seconds. Thus, even if the terminal device 3 is taken to automatically repeat the connection request, reconnection is declined for 10 seconds, and connection that is not in accordance with intent of the user is not repeated.

The connection prohibition period can be set freely by the user. If the connection prohibition period is short, reconnection becomes immediately possible, and effective elimination of a connection that is not in accordance with intent of the user is not possible. However, a connection prohibition period that is set excessively long can be bothersome in that connection sometimes cannot be made even though the connection is in accordance with intent of the user. Therefore, the connection prohibition period is set to a range such that, while connection not in accordance with intent of the user can be rejected, connection in accordance with intent of the user is not rejected. Rather than setting the connection prohibition period uniformly, the user may set the connection prohibition period in accordance with the type of the terminal device or the specific terminal device. Further, the connection prohibition period may change in accordance with a connection prohibition count. For example, the connection prohibition period may become longer with each increase in the connection prohibition count. Moreover, in the case in which connection becomes prohibited immediately after elapse of the connection prohibition period, the next connection prohibition period may be updated so as to be set longer than the previous connection prohibition period.

Figure 10:
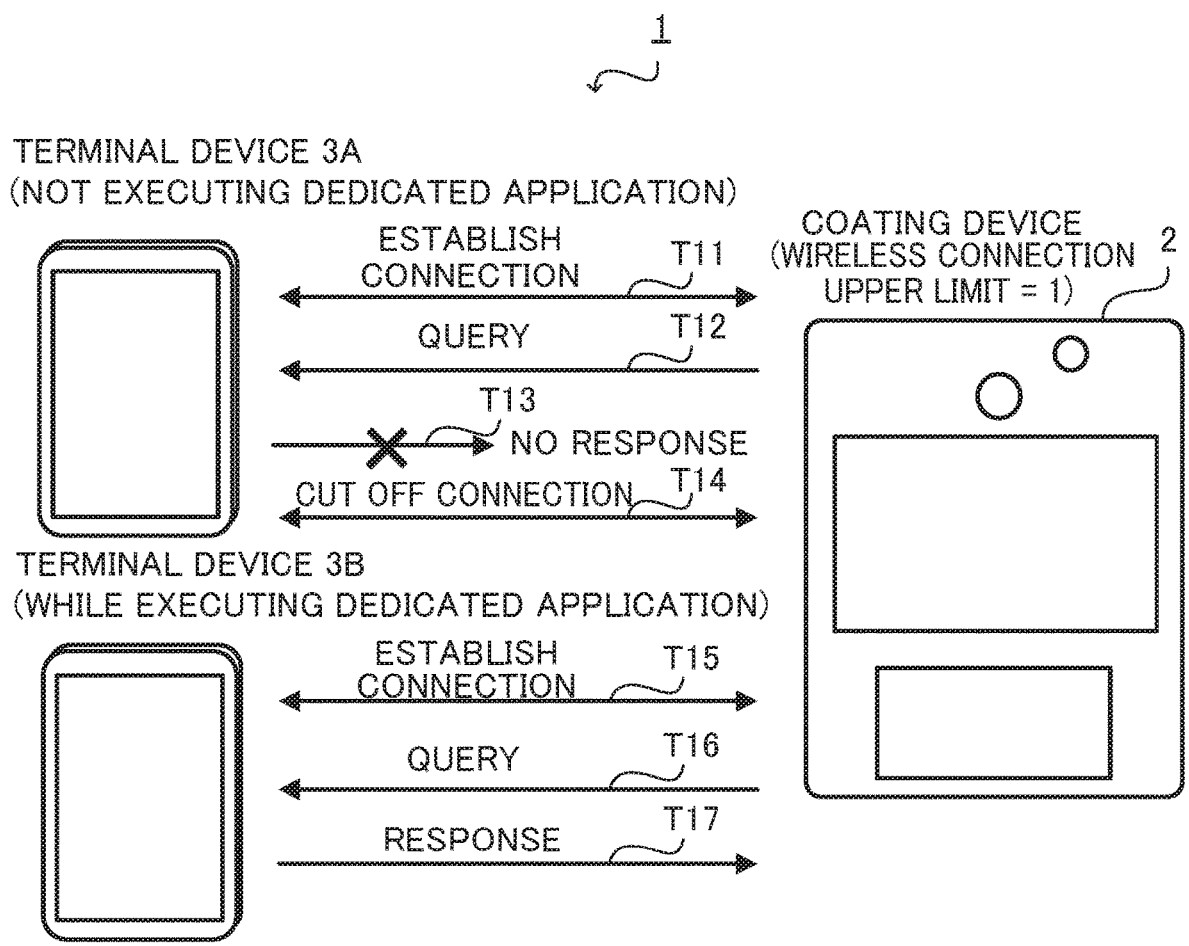
FIG. 10 is a drawing for description of a connection example of connection between the terminal device and the coating device according to the embodiment of the present disclosure.

FIG. 10 illustrates an example of connection between the terminal device and the coating device in the case in which connection to the coating device 2 is successively requested by a terminal device 3A and a terminal device 3B. The maximum wireless connection unit count of the coating device 2 is one unit, and a state is assumed to exist in which neither of the units is connected. Initially, the terminal device 3A sends a connection request to the coating device 2, and since neither of the units is connected to the coating device 2, the connection is then established (T11). Upon establishment of the connection between the terminal device 3A and the coating device 2, the coating device 2 sends a query for making a connection determination with respect to the terminal device 3A (T12). Here, the terminal device 3A is assumed not to run the dedicated coating application. When the dedicated coating application is not running, data in response is not transmitted from the terminal device 3A to the coating device 2 (T13). Due to the absence of the response from the terminal device 3A, the coating device 2 determines that the connection is not in accordance with intent of the user and automatically cuts off the connection with the terminal device 3A (T14). Next, the terminal device 3B requests connection to the coating device 2, and the connection between the terminal device 3B and the coating device 2 is established (T15). Upon establishment of the connection between the terminal device 3B and the coating device 2, the coating device 2 sends a query for making a connection determination with respect to the terminal device 3B (T16). Here, the dedicated coating application is running on the terminal device 3B, and thus the data in response is transmitted from the terminal device 3B to the coating device 2. Upon receiving the response from the terminal device 3B (T17), the coating device 2 determines that the connection is in accordance with intent of the user and maintains the wireless connection.

With reference again to FIG. 6, upon completion of connection decision processing (step S103), a determination is made, in connection determination processing, as to whether the connection is continuing to be maintained (step S104). In the connection determination processing, if the connection is cutoff and ended, in the case in which the connection request is rejected and ended due to the connection count reaching the upper limit of the connection requests or due to recording in the connection prohibition list, the new connection is not maintained. Therefore, in such cases, determination is made that the connection is not maintained (NO in step S104), processing returns to step S101, and the coating device 2 waits until there is a new connection request. If the connection determination processing ends with the maintenance of the connection, the determination is made to maintain the connection (YES in step S104), and a determination is made as to whether a certain period is passed, such as 1 minute (step S105). In the case in which the certain period is not yet passed (NO in step S105), shifting to the next processing step is on standby until passage of the certain period. Upon passage of the certain period (YES in step S105), processing shifts to connection update processing (step S106).

Connection Update Processing

Once connected with the coating device 2, the terminal device 3 continues the connection unless the coating device 2 reaches a position that exceeds a range in which communication is possible, power to the terminal device 3 is turned OFF, or the connection with the coating device 2 is forcibly cut off. Therefore, the state of connection between the terminal device 3 and the coating device 2 is maintained even when the coating is completed and the execution of the dedicated application ends. Connection update processing is performed in order to eliminate the state in which the unnecessary connection is continued.

Figure 11:
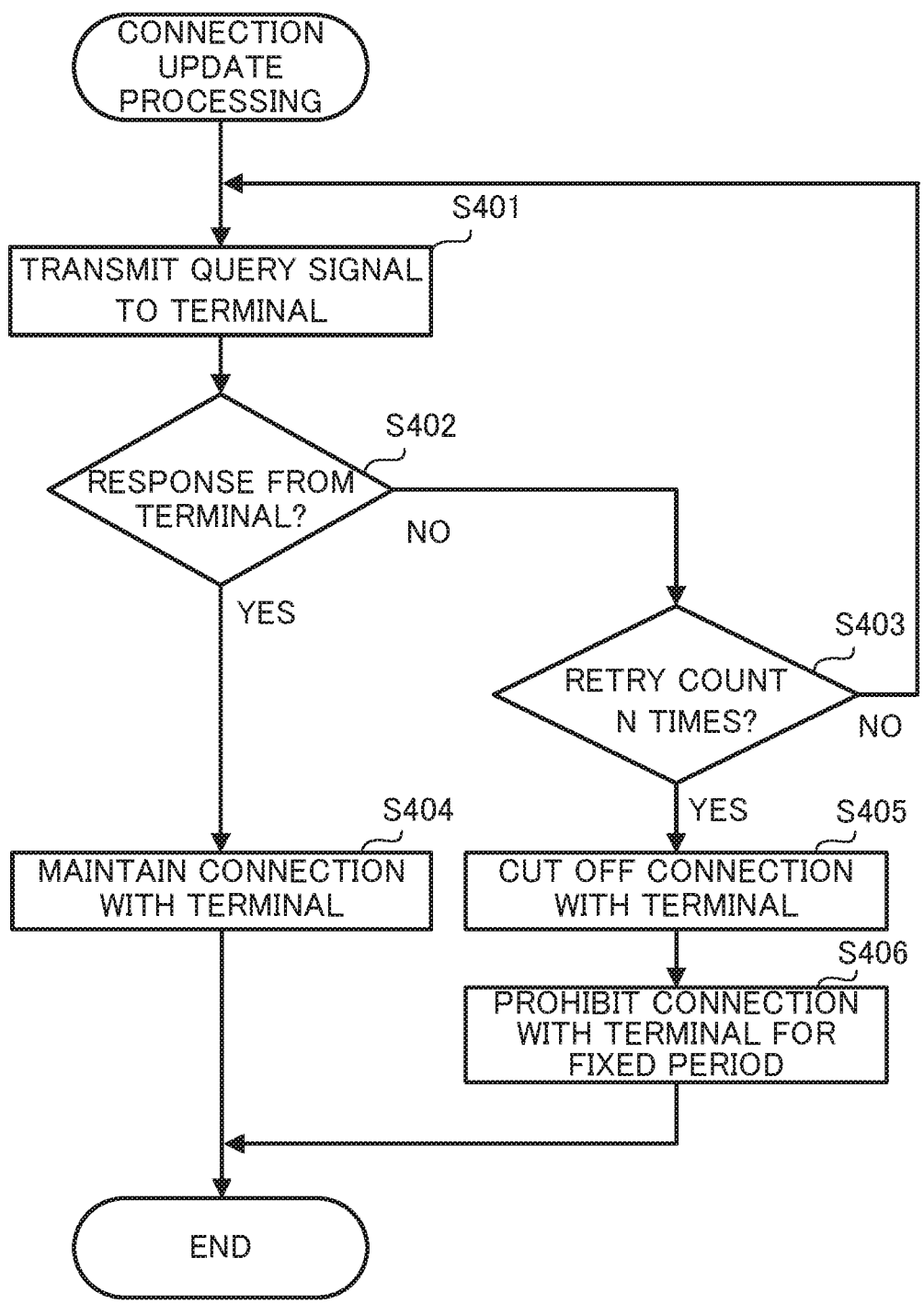
FIG. 11 is a flowchart illustrating connection update processing according to the embodiment of the present disclosure.

Connection update processing is illustrated in FIG. 11. In the connection update processing, firstly a query signal is transmitted to the terminal device 3 for which connection is established (step S401). At this time, the query signal is similar to that occurring in the connection determination processing of FIG. 7. For example, in the case of the wireless LAN, data as the query signal such as a UDP packet data is transmitted to the specified destination port allocated to the dedicated application. The data of the query signal is encoded and the content thereof cannot be read except by the dedicated application. The data of the query signal is data requesting a response indicating, when such data is received, that the dedicated application is being executed.

The coating device 2 checks whether there is a response from the terminal device 3 with respect to the query (step S402). Here, if the dedicated application is operating on the terminal device 3, the dedicated application transmits to the coating device 2 the response signal in response to the query signal. Upon confirmation of the response from the terminal device 3 (YES in step S402), the coating device 2 determines that the terminal device 3 is presently executing, or is preparing to execute, coating processing, and the coating device 2 maintains the wireless connection (S404) and ends the connection update processing.

In the case in which there is no response from the terminal device 3 (NO in step S402), the coating device 2 checks whether a count N (in which N is an integer greater than or equal to 1) is reached as the retry count of the queries sent to the terminal device 3 (step S403).

If N times is not yet reached as the retry count of the transmissions of the query signal (NO in step S403), the retry count of queries is incremented by 1, processing returns to step S401, and connection is rechecked. Again, the coating device 2 checks whether there is a response from the terminal device 3 with respect to the query (step S402). In the case in which there is no response from the terminal device 3 (NO in step S402), the coating device 2 checks whether the retry count reaches N times yet (step S403), and if the retry count does not yet reach N times (NO in step S403), the retry count is further incremented by 1. Thereafter, until the retry count reaches N times, the coating device 2 repeats the processing of step S401 to step S403 until there is a response from the terminal device 3.

If the retry count reaches N times without the response from the terminal device 3 (YES in step S403), the determination is made that the established wireless connection is not in accordance with intent of the user, and the coating device 2 cuts off the connection with the terminal device 3 (step S405). Then the terminal device 3 for which connection is cut off is prohibited for a fixed period from reconnecting with the coating device 2 (step S406). The prohibition processing of the reconnection is executed by writing of the MAC address, the connection prohibition start time, and the connection prohibition period of the terminal device 3 in the connection-prohibited terminal list illustrated in FIG. 9. Upon completion of the writing to the connection-prohibited terminal list, the connection update processing ends. Due to such processing, the wireless connection with the terminal device 3 can be automatically cut off when the dedicated application on the terminal device 3 ends during the connection.

With reference again to FIG. 6, upon completion of the connection update processing (step S106), determination is made as to whether the connection is cut off (step S107). During the connection update processing, in the case in which the connection is cut off and ended, the determination is made that the connection is cut off (YES in step S107), processing returns to step S101, and the coating device 2 waits for a new connection request. In the connection update processing, in the case of completion with the connection maintained, the determination is made that the connection is not cut off (NO in step S107), processing returns to step S105, and the coating device 2 waits until the certain period is passed. Upon passage of the certain period (YES in step S105), processing shifts again to the connection update processing (step S106). In the case in which, due to repeating of the connection update processing until cutoff of the connection, the coating processing ends, and the connection of the terminal device 3 with the coating device 2 becomes unnecessary, the connection is quickly cut off. Therefore, the connection that is not in accordance with intent of the user is rejected, and the terminal device that requires connection can quickly connect to the coating device 2. Further, the certain period can be set freely by the user. For example, in the case in which faster rejection is desired for the connection that is not in accordance with intent of the user, the certain period may be set to a shorter value.

In the present embodiment, upon establishment of the new wireless connection with the terminal device 3, the query to check whether continuation of such wireless connection is in accordance with intent of the user is sent to the terminal device 3, and based on the response of the terminal device 3 with respect to the query, the wireless connection with the terminal device 3 is maintained or is cut off.

Without the user performing an operation, such operation enables automatic prevention of continuation as is of the connection to the coating device 2 by the terminal device 3 that is the wireless communication device for which connection is not in accordance with intent. Moreover, by always rejecting unnecessary connections that are not in accord with intent of the user, connection can be performed quickly without rejecting the necessary connection that is in accordance with intent of the user.

In the aforementioned embodiment, whether the connection is in accordance with intent of the user is determined by whether the dedicated coating application is running, and then the connection is maintained or cut off. In contrast, the determination of whether the connection is in accordance with intent of the user may be made by whether the terminal device 3 is executing the dedicated application. The expression "executing the dedicated application" refers to the state in which the application is executed and that processing for causing execution of the coating function that is the function of the coating device 2 is actually being performed, and this excludes the executable state in which the application is just running. In the case in which the application is actually causing execution of coating, the response signal is output in response to the query signal from the coating device 2. However, in the execution-capable state in which the application is not performing processing for causing execution of coating, the application does not output the response signal in response to the query signal from the coating device 2. Alternatively, a response signal may be output to the effect that the application is not being executed. Based on the response signal, when the dedicated application is being executed, the determination is made that the connection is in accordance with intent of the user, and the connection is maintained. However, in the case in which the dedicated application is not being executed, the determination is made that the connection is not in accordance with intent of the user, and the connection is cut off.

The case is also considered in which, even though the dedicated application is running, the dedicated application is not actually being used, but rather the user simply forgets to end the dedicated application. By determining whether the connection is in accordance with intent of the user by whether the application is executed and the processing is actually being executed for causing execution of the coating function that is the specific function of the coating device 2 that is the wireless communication device, the aforementioned unnecessary connection can be rejected.

Moreover, maintenance or cutting off of the connection may be determined according to whether the connection is in accordance with intent of the user based on whether transmitting-receiving occurs between the terminal device 3 and the coating device 2 within a certain period after the establishment of the connection. In this case, the determination may be based on whether there is prior transmitting-receiving between the terminal device 3 and the coating device 2 via the dedicated application, or the determination may be based on whether there is prior transmitting-receiving between the terminal device 3 and the coating device 2 without transmitting-receiving via the dedicated application. In the case in which mutual transmitting-receiving is performed within the certain period, the connection is considered to be in accordance with intent of the user. Therefore, by performing maintenance or cutoff of the connection based on whether there is transmitting-receiving between the terminal device 3 and the coating device 2, the connection not in accordance with intent of the user can be rejected. Further, if the determination is based on whether there is transmitting-receiving within the certain period, the coating device 2 can grasp whether to perform maintenance or cutoff of the connection even without sending the query to the terminal device 3. By storing a history of transmitting-receiving of the coating device 2 in the memory, the determination of whether to maintain or cut off the connection can be made without being based on a response from the terminal device 3.

In the aforementioned embodiment, the terminal device 3 makes a connection request with respect to the coating device 2, and performs connection establishment processing for establishing the wireless connection between the terminal device 3 and the coating device 2. In contrast, the coating device 2 may make a connection request with respect to the terminal device 3, and perform connection establishment processing for establishing the wireless connection between the terminal device 3 and the coating device 2.

Although an example is described in the aforementioned embodiment in which the terminal device 3 is a portable terminal such as a smartphone, tablet PC, or the like, as long as the device has a function for wireless communication with a communication partner, of course, wide application is possible to devices for forming images such as scanners, digital cameras, or the like.

Although an example is described in the aforementioned embodiment in which the coating device 2 is used as the wireless communication device, wide application is possible as long as the used device is an electronic device that has a function for wireless communication with the wireless communication partner. For example, wide application is of course possible to devices for forming images, such as scanners, digital cameras, or the like.

Although an example in the aforementioned embodiment is described of a handy printer that applies ink by scanning the coating device itself in the sub-scanning direction, such configuration is not limiting, and the coating device may be a handy printer or a stationary coating device that has a head moving mechanism for moving the ink head.

Although an example in the aforementioned embodiment is described of use of the inkjet method as the coating method, such configuration is not limited, and the method may be a laser printing method, a thermal transfer method, an ink ribbon method, or the like.

Although a sheet-like member is cited as the coating medium R, the coating workpiece may be freely selected and may have a three-dimensional shape.

Although an example is cited in the aforementioned embodiment in which the coating-start switch 21, the display device 22, the operation keys 23, and the LED 24 are arranged on the upper surface of the coating device 2, such components may be arranged on the terminal device 3. A touch panel may be integrally arranged on the surface of the display unit of the terminal device 3, operations such as various types of inputs, settings, or the like may be performed by touch operation of the touch panel, the display unit may be configured to function as the display device 22, and the touch panel may be configured to function as the coating-start switch 21 and the operation keys 23. Notifications may be provided to the user by using the display unit of the terminal device 3, rather than the LED 24, to display information such as messages.

Although an example is cited in the aforementioned embodiment in which the LED 24 becomes illuminated and provides notification to the user that the coating-start position is reached, that the coating is completed, or the like, this configuration is not limiting, and the coating device 2 may be equipped with an imaging unit that includes an imaging device and illumination, and by the image displayed on the display unit of the display device 22 or the terminal device 3 via the imaging device, the user may visually check the surface of the coating medium R, finely adjust position, or the like.

In the aforementioned embodiment, by executing a program stored in the ROM 32, the central control circuit 31 functions as the wireless communication control unit 43 and the coating control unit 44 of the control unit 41. However, rather than the central control circuit 31, the control unit 41 may be equipped with dedicated hardware such as an application specific integrated circuit (ASIC), a field-programmable gate array (FPGA), various types of control circuits, or the like, and the dedicated hardware may function as the wireless communication control unit 43 and the coating control unit 44. In this case, the functions of each unit may be executed by separate hardware, or a single hardware unit may collectively function as each of the units. Moreover, among the functions of the various units, a portion may be achieved by dedicated hardware, and the remaining portion may be achieved by software or firmware.

Further, based on the ability to provide a wireless communication device previously equipped with the configuration for achieving the functions according to the present disclosure, an existing information processing device or the like, by use of the program, can be made to function as the wireless communication device according to the present disclosure. The method of use of such a program is freely selected. The program may be used by storage on a computer-readable storage medium such as a flexible disc, a compact disc (CD)-ROM, a digital versatile disc (DVD)-ROM, a memory card, or the like. Furthermore, the program may be superimposed on a carrier wave, and may be used via a communication medium such as the Internet. For example, the program may be posted on a bulletin board system (BBS) on a communication network and then distributed. A configuration may be used in which the aforementioned processing is executed by initiating the program, and by execution under the control of an operating system (OS) in the same manner as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device comprising:
a first function control circuit configured to execute a first function; and
a processor;
wherein the processor is configured to:
establish a wireless connection with a terminal device upon request for the wireless connection from one of the wireless communication device and the terminal device,
query, upon establishment of the wireless connection with the terminal device, the terminal device with which the wireless connection is established to check whether a first application program for causing the wireless communication device to execute the first function is in a state of being executed or run by the terminal device,
maintain or cut off the wireless connection with the terminal device based on a response from the terminal device to the query,
after a predetermined period has elapsed since a time at which the wireless connection with the terminal device is maintained based on the response from the terminal device to the query, re-query the terminal device with which the wireless connection is maintained, and cut off or continue to maintain the maintained wireless connection based on a response from the terminal device to the re-query, and
identify, as a connection-prohibited terminal device, a terminal device not responding to at least a predetermined number of queries, cut off the wireless connection with the connection-prohibited terminal device, and prohibit the connection-prohibited terminal device from reconnecting to the wireless communication device within a connection prohibition period, the connection prohibition period being updated in accordance with a number of times that the wireless connection has been cut off.

2. The wireless communication device according to claim 1, wherein:
the query includes information decipherable only by the first application program, and
when there is no response to the query from the terminal device, the processor cuts off the wireless connection with the terminal device.

3. The wireless communication device according to claim 1, wherein:
the processor executes the query a certain number of times, and
when there is no response from the terminal device to the query executed the certain number of times, the processor determines that the wireless connection is not requested by a user, and cuts off the wireless connection with the terminal device.

4. The wireless communication device according to claim 1, wherein:
the wireless communication device is a coating device,
the first function is a function of applying ink, and
the first function control circuit is an ink head control circuit.

5. The wireless communication device according to claim 1, wherein:
the query is a query to which the terminal device can respond to when the first application program is in the state of being executed or run by the terminal device and cannot respond to when the first application program is not in the state of being executed or run by the terminal device.

6. The wireless communication device according to claim 1, wherein:
when the wireless connection with the terminal device is maintained, the processor controls the first function by the first function control circuit based on the wireless connection with the terminal device by which the first application program is being executed.

7. The wireless communication device according to claim 1, wherein:
when a state of a response of the terminal device with respect to the query indicates that the first application program is in the state of being executed or run by the terminal device, the processor maintains the wireless connection with the terminal device, and
when a state of a response of the terminal device with respect to the query indicates that the first application program is not in the state of being executed or run by the terminal device, the processor cuts off the wireless connection with the terminal device.

8. The wireless communication device according to claim 1, wherein:
when the processor cuts off the wireless connection with the terminal device, the processor stores information for identification of the terminal device in a connection-prohibited terminal list.

9. The wireless communication device according to claim 8, wherein:
the processor is configured to store a media access control address of the terminal device, a connection prohibition start time, and the connection prohibition period in the connection-prohibited terminal list when the first application program is not in the state of being executed or run by the terminal device.

10. The wireless communication device according to claim 1, wherein the connection prohibition period is set by a user.

11. The wireless communication device according to claim 1, wherein the connection prohibition period is set longer with each increase in a connection prohibition count.

12. The wireless communication device according to claim 1, wherein:
when the wireless connection with the terminal device is cut off immediately after elapse of the connection prohibition period, a next connection prohibition period is set longer than the connection prohibition period.

13. A wireless communication system comprising:
a wireless communication device and a terminal device configured to wirelessly communicate with each other, the wireless communication device comprising a first processor and a first function control circuit configured to execute a first function, and the terminal device comprising a second processor, wherein:

the first processor of the wireless communication device is configured to:
establish the wireless connection with the terminal device upon request for the wireless connection from one of the wireless communication device and the terminal device,
query, upon establishment of the wireless connection with the terminal device, the terminal device with which the wireless connection is established to check whether a first application program for causing the wireless communication device to execute the first function is in a state of being executed or run by the terminal device,
maintain or cut off the wireless connection with the terminal device based on a response from the terminal device to the query,
after a predetermined period has elapsed since a time at which the wireless connection with the terminal device is maintained based on the response from the terminal device to the query, re-query the terminal device with which the wireless connection is maintained, and cut off or continue to maintain the maintained wireless connection based on a response from the terminal device to the re-query, and
identify, as a connection-prohibited terminal device, a terminal device not responding to at least a predetermined number of queries, cut off the wireless connection with the connection-prohibited terminal device, and prohibit the connection-prohibited terminal device from reconnecting to the wireless communication device within a connection prohibition period, the connection prohibition period being updated in accordance with a number of times that the wireless connection has been cut off, and
the second processor of the terminal device is configured to respond to the query from the wireless communication device.

14. A wireless communication method executed by a wireless communication device for communication with a terminal device, the method comprising:
establishing a wireless connection with the terminal device upon request for the wireless connection from one of the wireless communication device and the terminal device;
querying, upon establishment of the wireless connection with the terminal device, the terminal device with which the wireless connection is established to check whether a first application program for causing the wireless communication device to execute a first function is in a state of being executed or run by the terminal device;
maintaining or cutting off the wireless connection with the terminal device based on a response from the terminal device to the query;
after a predetermined period has elapsed since a time at which the wireless connection with the terminal device is maintained based on the response from the terminal device to the query, re-querying the terminal device with which the wireless connection is maintained, and cutting off or continuing to maintain the maintained wireless connection based on a response from the terminal device to the re-query; and
identifying, as a connection-prohibited terminal device, a terminal device not responding to at least a predetermined number of queries, cutting off the wireless connection with the connection-prohibited terminal device, and prohibiting the connection-prohibited terminal device from reconnecting to the wireless communication device within a connection prohibition period, the connection prohibition period being updated in accordance with a number of times that the wireless connection has been cut off.

15. A non-transitory computer-readable recording medium having stored thereon a program for causing a computer included in a wireless communication device to execute processing comprising:
establishing a wireless connection with a terminal device upon request for the wireless connection from one of the wireless communication device and the terminal device;
querying, upon establishment of the wireless connection with the terminal device, the terminal device with which the wireless connection is established to check whether a first application program for causing the wireless communication device to execute a first function is in a state of being executed or run by the terminal device;
maintaining or cutting off the wireless connection with the terminal device based on a response from the terminal device to the query,
after a predetermined period has elapsed since a time at which the wireless connection with the terminal device is maintained based on the response from the terminal device to the query, re-querying the terminal device with which the wireless connection is maintained, and cutting off or continuing to maintain the maintained wireless connection based on a response from the terminal device to the re-query, and
identifying, as a connection-prohibited terminal device, a terminal device not responding to at least a predetermined number of queries, cutting off the wireless connection with the connection-prohibited terminal device, and prohibiting the connection-prohibited terminal device from reconnecting to the wireless communication device within a connection prohibition period, the connection prohibition period being updated in accordance with a number of times that the wireless connection has been cut off.

\* \* \* \* \*